No. 728,369.                                                     Patented May 19, 1903.

UNITED STATES PATENT OFFICE.

ARTHUR W. CHASE, OF AVOCA, IOWA.

BRIQUET.

SPECIFICATION forming part of Letters Patent No. 728,369, dated May 19, 1903.

Application filed February 28, 1899. Renewed October 1, 1902. Serial No. 125,601. (No model.)

*To all whom it may concern:*

Be it known that I, ARTHUR W. CHASE, a citizen of the United States, residing at Avoca, in the county of Pottawattamie and State of Iowa, have invented certain new and useful Improvements in Briquets; and I do hereby declare the following to be a full, clear, and exact description of the invention, such as will enable others skilled in the art to which it appertains to make and use the same.

My invention relates to an improvement in briquets made from ores of the brown hematite class mixed with powdered blue-billy.

The operation of making the briquets is as follows: Ores of the brown hematite class ($2Fe_2O_3.3H_2O$)—that is to say, hydrated ferric oxid—are finely pulverized and mixed in any suitable dry mixer with the pulverized purple ore or blue-billy obtained as a by-product in the making of sulfuric acid. The proportions of the hematite ores and the blue-billy may vary very widely; but in practical treatment of certain ores which I have actually used I find that from ten to twenty per cent. of the brown hematite ore, ($2Fe_2O_3.3H_2O$,) especially if it carries considerable alumina, makes excellent briquets when mixed with from eighty to ninety per cent. of blue-billy. As soon as the hematite ore and blue-billy have become thoroughly incorporated with each other a small proportion of steam, or preferably steam mixed with carbonic acid, ($CO_2$,) is admitted to the mixer, enough steam being used to slightly moisten the mixture. This moist mixture is then pressed into briquets and for convenience is usually subjected to a preliminary drying, although this is not necessary. These briquets are then baked at a red heat. At this temperature the water of crystallization contained in the brown hematite ores is driven off, leaving the red oxid, ($Fe_2O_3$.)

The operation of baking at a red heat causes the brown hematite ores and the blue-billy to be firmly combined together physically, being agglutinated together under the action of heat, the brown hematite ore in the act of losing its water of crystallization changing its structure and serving as a binding agent for the blue-billy. Moreover, certain chemical changes occur, as an analysis of the briquets shows the presence of a certain quantity of the magnetic oxid of iron, ($Fe_3O_4$.)

Many of the brown hematite ores carry a considerable percentage of aluminium in combination, running as high in some instances as fifteen or twenty per cent. This acts as an additional binding agent and is in no way harmful in the succeeding process of smelting. The briquet obtained has certain marked and distinctive properties. It is a homogeneous mass, all the parts thereof being firmly combined together. It is slightly porous, as in the operation of baking the water admixed being driven off leaves spaces behind. This physical property renders them better suited for blast-furnace work and easier to reduce, for the reason that the reducing agents can get into the interior structure of the briquet more easily than would be the case if the briquets were perfectly solid, it of course being understood that these briquets are prepared especially to be smelted in a blast-furnace. The chief advantage of these briquets, however, is that they will stand the heat and pressure to which they are subjected in a blast-furnace during the operation of smelting without disintegration, and so far as I am aware no briquets have ever been produced prior to my present invention which possess these qualities.

Ordinary briquets when put into blast-furnaces disintegrate very readily under the heat and pressure to which they are subjected. They thereby clog the furnace, and much of this substance is carried off in the blast, clogging the stoves, and entailing waste, and this fact renders them useless in blast-furnace work, except in very small quantities when used in connection with other ores. Briquets formed in the manner above described are entirely free from this objection.

Having thus described my invention, what I claim as new, and desire to secure by Letters Patent of the United States, is—

A briquet composed of pulverulent brown hematite ores and powdered blue-billy fritted or fused together, substantially as described.

In testimony whereof I affix my signature in presence of two witnesses.

ARTHUR W. CHASE.

Witnesses:
JOHN CHALMERS WILSON,
JOHN H. HOLT.